United States Patent
Spektor et al.

(10) Patent No.: US 9,031,126 B2
(45) Date of Patent: May 12, 2015

(54) METHOD AND SYSTEM FOR VIDEO ENCODING USING NOISE LEVEL ESTIMATES FROM VERTICAL BLANKING INTERVAL TV LINES

(75) Inventors: Evgeny Spektor, Petach-Tikva (IL); David Drezner, Raanana (IL); Shevach Riabtsev, Haifa (IL); Gennady Mayko, Herzlia (IL)

(73) Assignee: Broadcom Corporation, Irvine, CA (US)

( * ) Notice: Subject to any disclaimer, the term of this patent is extended or adjusted under 35 U.S.C. 154(b) by 2657 days.

(21) Appl. No.: 11/591,163

(22) Filed: Nov. 1, 2006

(65) Prior Publication Data

US 2008/0232458 A1    Sep. 25, 2008

(51) Int. Cl.
*H04N 7/12* (2006.01)
*G06K 9/40* (2006.01)
*H04N 19/136* (2014.01)
*H04N 19/172* (2014.01)
*H04N 19/61* (2014.01)
*H04N 19/103* (2014.01)

(52) U.S. Cl.
CPC ........... *H04N 19/136* (2013.01); *H04N 19/172* (2013.01); *H04N 19/61* (2013.01); *H04N 19/103* (2013.01)

(58) Field of Classification Search
None
See application file for complete search history.

(56) References Cited

U.S. PATENT DOCUMENTS

| | | | | |
|---|---|---|---|---|
| 6,064,450 | A * | 5/2000 | Canfield et al. | 375/240.29 |
| 6,359,658 | B1 * | 3/2002 | He et al. | 348/607 |
| 7,663,701 | B2 * | 2/2010 | de Garrido et al. | 348/620 |
| 7,667,776 | B2 * | 2/2010 | Li et al. | 348/607 |
| 7,715,634 | B2 * | 5/2010 | Lei et al. | 382/224 |
| 2001/0033692 | A1 * | 10/2001 | Borneo et al. | 382/205 |
| 2005/0281479 | A1 * | 12/2005 | Song | 382/275 |
| 2007/0094583 | A1 * | 4/2007 | Randall et al. | 715/500.1 |
| 2007/0121003 | A1 * | 5/2007 | Leary | 348/465 |

* cited by examiner

*Primary Examiner* — Frederick Bailey
(74) *Attorney, Agent, or Firm* — Foley & Lardner LLP; Christopher J. McKenna; Helen H. Zhang

(57) ABSTRACT

A system and method for video encoding using noise level estimates from vertical blanking interval lines. A video signal may be received by an encoding system. Information may be extracted from the video signal and may be analyzed. The extracted information may be vertical blanking intervals. The extracted and analyzed information may be utilized to estimate a noise level of the video signal. The estimated noise level may then be utilized in encoding the video signal by being inserted into the video signal or used to change parameters used in video encoding.

24 Claims, 7 Drawing Sheets

METHOD AND SYSTEM FOR VIDEO ENCODING USING NOISE LEVEL ESTIMATES FROM VERTICAL BLANKING INTERVAL TV LINES

CROSS-REFERENCE TO RELATED APPLICATIONS/INCORPORATION BY REFERENCE

[Not Applicable]

FIELD OF THE INVENTION

Certain embodiments of the invention relate to processing of video signals. More specifically, certain embodiments of the invention relate to a method and system for video encoding using noise level estimates from vertical blanking interval TV lines.

BACKGROUND OF THE INVENTION

Video systems rely greatly on the encoding process to compress video in preparation for transmission, or to transform it from one format to another. Encoding video involves techniques that seek to ensure as much compression as possible with as few errors or artifacts as possible, with as high quality as possible. One of the main causes of artifacts and low quality or quality degradation in video processing is noise. Therefore, estimating noise before encoding a video has become an essential part of the video encoding process.

Noise level estimation in the analog input TV signal during the process of video encoding allows improving of the qualitative and quantitative characteristics and parameters of the encoded video. Qualitative characteristics can be, for example, using different filters coefficients for the video pre-processing or different quantization levels for subjective increase of the video quality of the encoded data. And quantitative characteristics can be, for example, using different bit rates to conserve the space on the external storage device for the encoded data.

Noise sources act on all components of the analog TV signal during its distribution. As a result the lines from the active video region and other parts of the TV signal are exposed to noise. The lines from the active video region are the lines displayed by the TV receiver, e.g. lines 22-240 of each field of the NTSC signal. Other parts of the TV signal are lines from the vertical blanking region, e.g., lines 10-21 of each field of the NTSC signal. The latter are not included into the output video encoded data and so they are not displayed when encoded video data is decoded and presented.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for video encoding using noise level estimates from vertical blanking interval TV lines, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
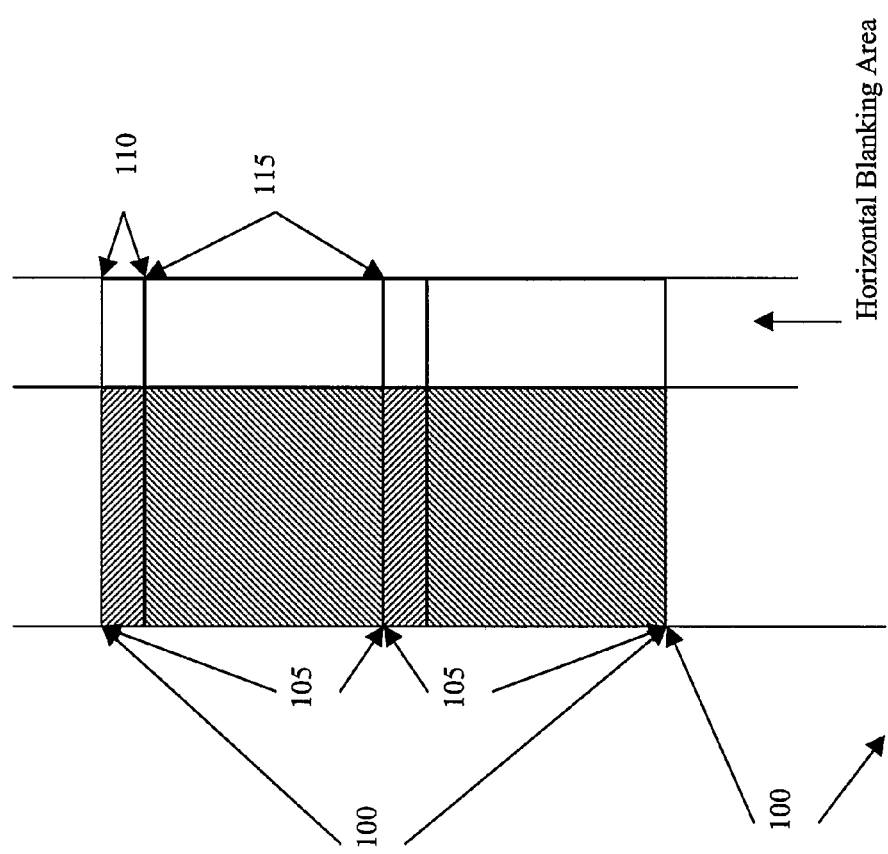
FIG. 1A illustrates an exemplary digitized video signal, in accordance with an embodiment of the present invention.

Certain embodiments of the invention may be found in a method and system for video encoding using noise level estimates from vertical blanking interval TV lines.

In a TV signal, the lines from the active video region are the lines displayed by the TV receiver, e.g. lines 22-240 of each field of the NTSC signal. Other parts of the TV signal are lines from the vertical blanking region, e.g., lines 10-21 of each field of the NTSC signal. The non-active video region, i.e., the lines that are not from the active video region, is not included in the output video encoded data and is not displayed when encoded video data is decoded and presented. However the non-active region of a TV signal is available during the encoding process and is included in the output digitized video signal from the video decoder (VDEC) that is used as an input to the video encoder.

The TV signals may be sampled to produce digitized samples of the signals. Portions of the signal that are known to be constant may be analyzed to determine an estimate of the noise level. The analysis may be done using statistical methods. When there is no noise in the signal, the values of the digitized samples may be similar, and when noise is present in the signal the values of the digitized samples may differ from one another.

In an embodiment of the present invention, some parts of the active video region may have constant content. It may be unpredictable whether the parts with the constant content may be found during the encoding process. However, TV lines in the vertical blanking region may not contain vertical blanking interval (VBI) data, but may contain the so-called "black" level and their digitized samples may be constant. As a result, the noise level may be estimated by analyzing the digitized samples of the lines in the vertical blanking region. In an embodiment of the present invention, the purpose of estimation may be to analyze several hundreds of the samples. For example, the samples may be the length of one digitized TV line.

In an embodiment of the present invention, lines from vertical blanking region may contain VBI data, which may be transferred in parallel to the TV picture. For the noise level estimation, these lines from the vertical blanking region that do not contain VBI data may be selected.

In an embodiment of the present invention, all the lines in the vertical blanking region may contain VBI data and in such an embodiment noise level may be estimated as described hereinafter. Analog waveforms of VBI signals have special sequences for the bit and data synchronization, which may be used for decoding VBI data. The special sequences for bit and data synchronization may contain a predefined set of logical levels (0 and 1) that may be represented by the different constant voltage levels and may have predefined duration and position in the TV line, according to the type of the VBI data. Those parts of the TV lines where these sequences may be positioned may not change even when actual VBI data is transferred, and as a result these parts of the TV lines may be used for noise estimation. Additionally, these constant parts of the TV lines with VBI data may be relatively short, and therefore lines from several fields may be used for noise estimation.

In an embodiment of the present invention, a VDEC may not decimate lines from the vertical blanking region, and may use those intervals for stuffing data during scaling of the video image, for example, to change the number of lines per field or number of pixels per line. In this case, some or all the lines from the video blanking region may be included in the active video region of the digitized TV signal. This may allow analysis of the digitized samples of the lines to perform noise estimation. The video encoder may remove or skip these lines from the encoded content using, for example, a vertical offset encoding parameter.

In an embodiment of the present invention, noise level estimation may be accomplished by measuring the difference between the root-mean-square (RMS or standard deviation) value and the mean value of the samples. Other methods of signal analysis may also be utilized to estimate the noise level.

The estimated level of the noise may be directly used in the process of video encoding by adjusting the value of some of the parameters used in the video encoding process such as, for example, different filters' coefficients, quantization levels, bit rate, etc.

The estimated level of the noise may also be transferred to the host application, by writing the value of the estimated level of noise into one or several registers of the encoder and raising some hardware interrupt line or software flag, for example. The host application may use this value for the whole system parameter adjustment such as, for example, changing filter coefficients in the VDEC.

The estimated level of noise values may be also inserted into the encoded video stream itself, for example, into the user's data section in the encoded MPEG stream. These values may be used later to analyze the analog TV channel characteristics.

The noise level may be estimated, for example, for NTSC standard signals and for other TV standards that have lines in the vertical blanking region such as, for example, PAL and SECAM.

FIG. 1A illustrates an exemplary digitized video signal, in accordance with an embodiment of the present invention. A digitized video signal may be a continuous stream of digitized luminance and chrominance or raw samples with additional information about the beginning and/or end of the corresponding TV line and field. The streaming data may correspond to data from the picture from left to right and from top to bottom. The exemplary digitized video signal in FIG. 1A corresponds to data from one TV line.

In an embodiment of the present invention, the TV signal may be represented by the continuous sequence of TV Frames 100. Each TV Frame 100 may comprise several TV Fields 105, for example, 2 TV Fields for NTSC standard, Field 0 and Field 1. Each TV Field 105 may comprise several TV lines, for example, 240 for NTSC. In each TV Field 105 there may be a Vertical Blanking Area/Region 110 (lines 10 . . . 21 for NTSC) and an Active Video Area/Region 115 (lines 22 . . . 240 for NTSC).

Lines in the Active Video Area/Region 115 may be processed by the Video Encoder and may be included in the encoded output data. Lines from the Vertical Blanking Area/Region 110 may be ignored during the encoding process, and may subsequently be used for noise estimation if no Vertical Blanking Information (VBI) data is transferred in them.

In an embodiment of the present invention, VBI data may be transferred in all TV lines in the Vertical Blanking Area. In such a situation, the constant parts of the VBI data waveforms may be utilized to estimate the noise level.

Figure 1B:
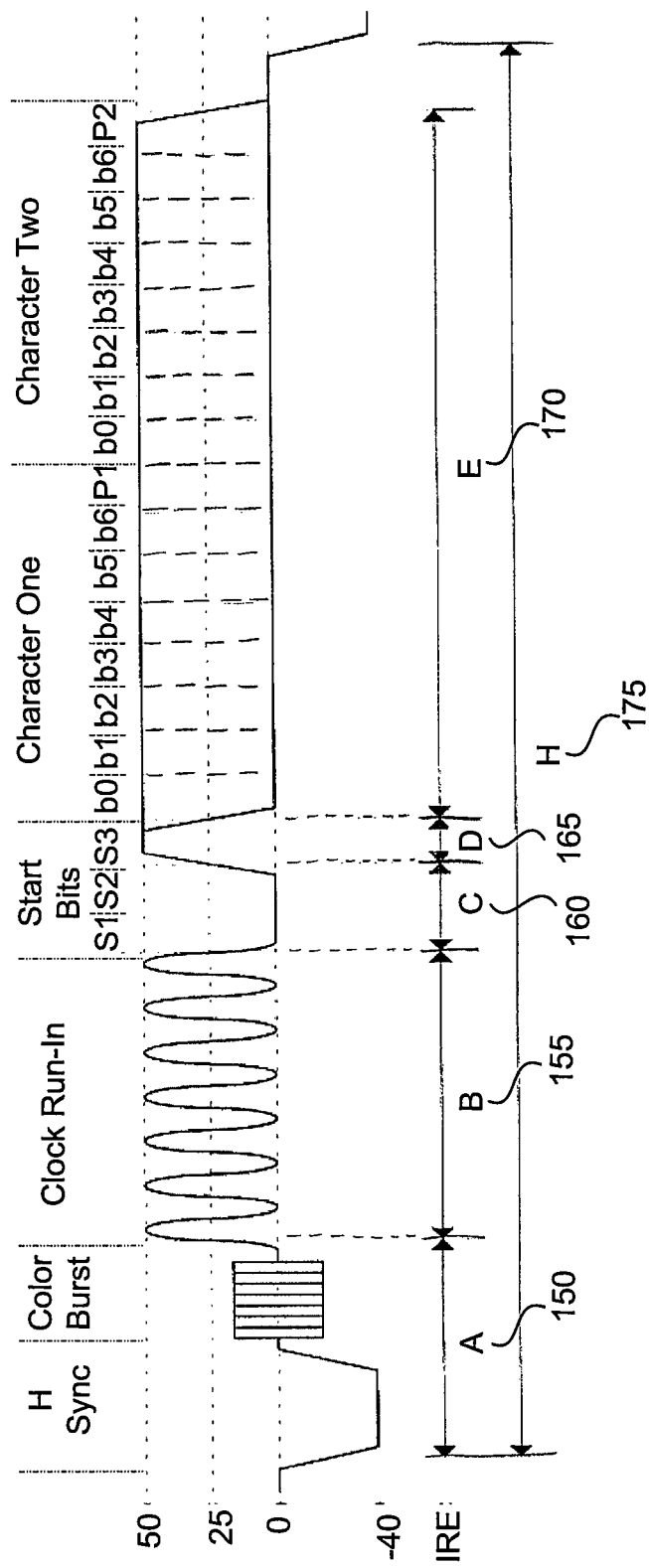
FIG. 1B illustrates an exemplary waveform of VBI data, in accordance with an embodiment of the present invention.

FIG. 1B illustrates an exemplary waveform of VBI data, in accordance with an embodiment of the present invention. Particularly, the VBI Closed Caption (CC) data waveform (transferred in line 21 of the NTSC TV signal) is represented by the waveform of FIG. 1B. Sections C (160) and D (165) may be the same for any transmitted data and the values of the samples in those sections may be constant for each VBI CC data line. As a result, it may be possible to use section C and D for the noise estimation even if Vertical Blanking Information (VBI) data is transferred in this TV line.

VBI data waveforms for most VBI standards (Teletext, CGMS-A, etc.) may have constant sections with predefined position and amplitude, which may be used for the noise level estimation.

Figure 2:
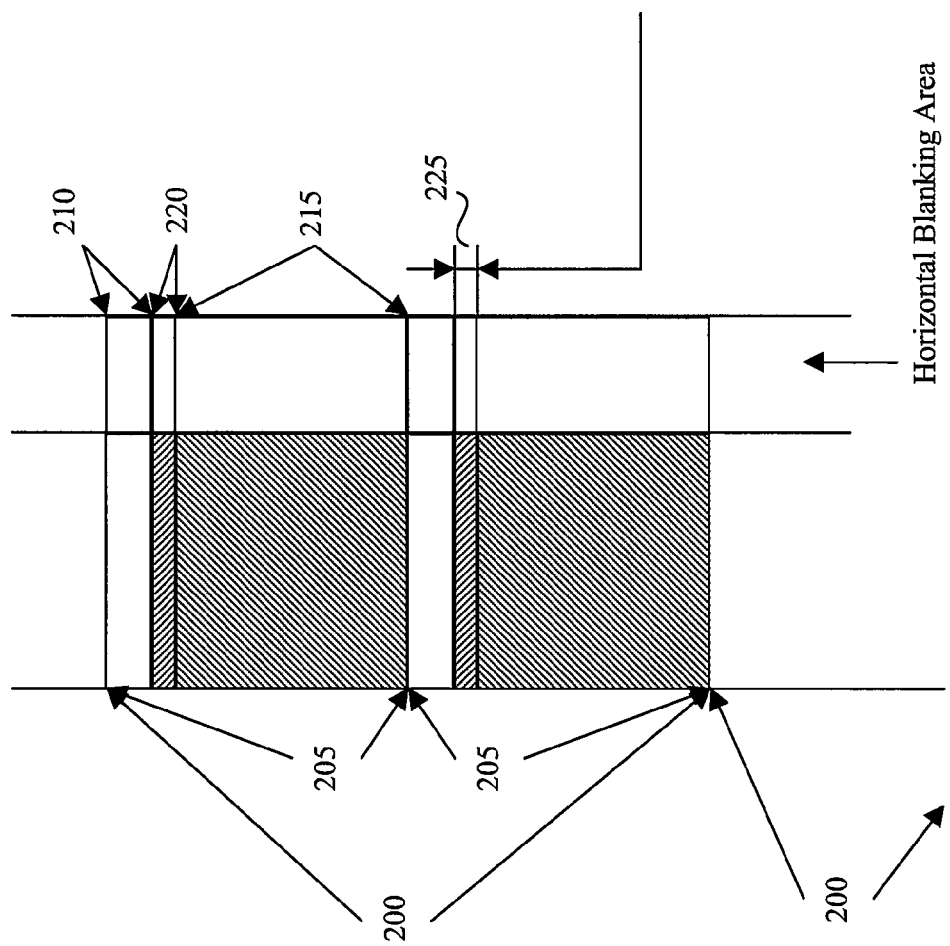
FIG. 2 illustrates another exemplary digitized video signal, in accordance with an embodiment of the present invention.

FIG. 2 illustrates an exemplary digitized video signal, in accordance with an embodiment of the present invention. In an embodiment of the present invention, the TV signal may be represented by the continuous sequence of TV Frames 200. Each TV Frame 200 may comprise several TV Fields 205, for example, 2 TV Fields for NTSC standard, Field 0 and Field 1. Each TV Field 205 may comprise several TV lines, for example, 240 for NTSC. In each TV Field 205 there may be a Vertical Blanking Area 210 and an Active Video Area 215 and 220 (lines 20 . . . 240 for NTSC).

The digitized video signal of FIG. 2 may be an output digitized video signal from the VDEC in which the VBI lines may not be digitized. In an embodiment of the present invention, the VDEC may not digitize VBI TV lines in the vertical blanking area 210 and the horizontal blanking area and may use them as a stuffing/padding area during vertical and horizontal scaling. The VDEC may allow specifying the numbers of TV lines to be included into the Active Video Area 215 so they will be digitized. In such an embodiment, some VBI lines may be included into the Active Video Area 215 and their digitized values may be used for the noise level estimation. Simultaneously, the VBI lines may be excluded/skipped from the output-encoded data by using a Vertical Offset parameter 220 or 225 in the Video encoder. The Vertical Offset parameter 220 or 225 may be for example 2 lines.

Figure 3:
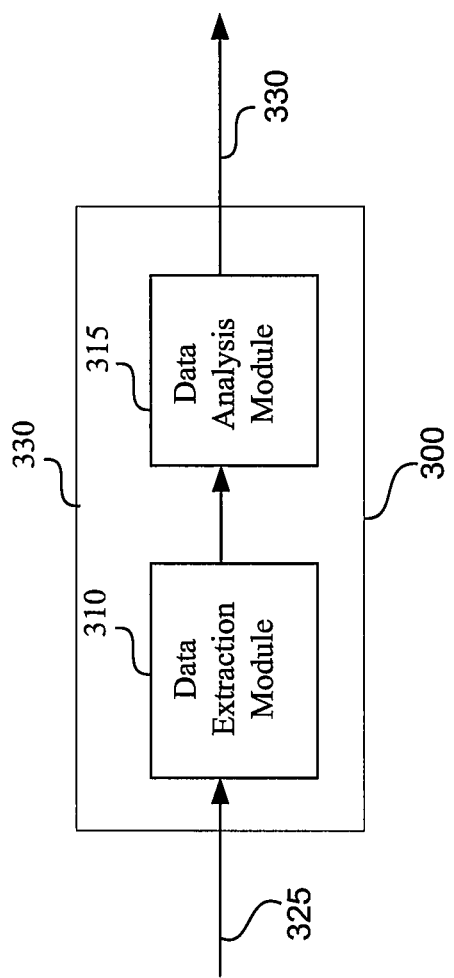
FIG. 3 illustrates an exemplary block diagram of a noise level estimation device, in accordance with an embodiment of the present invention.

FIG. 3 illustrates an exemplary block diagram of a noise level estimation device, in accordance with an embodiment of the present invention. A noise level estimation device 300 may comprise a data extraction module 310 and a data analysis module 315. In an embodiment of the present invention, the noise level estimation device 300 may be part of a video encoder.

The input 325 to the noise level estimation device 300 may be a digitized video signal received from the video decoder (VDEC). The input 325 may be digitized video samples such as, for example, in a format according to the CCIR-656 recommendation. Additionally the input 325 may comprise data samples, which may contain luminance, chrominance or raw digitized data. The input 325 may be transferred to the input of the data extraction module 310.

The data extraction module 310 may select from the input data 325 samples that may contain the constant values in a video signal and thus may be analyzed for the noise level estimation. This selection/extraction may be performed either in a hardware and/or software module. The data extraction module 310 may receive information that is necessary for the process of extraction such as, for example, fields, lines, and pixels numbers, etc., from a host application or from a video encoder. This information may be transferred from the host application or from the video encoder to the data extraction module 310 during initialization of the encoding process or in the process of encoding, for example. The data extraction module 310 may extract luminance, chrominance or raw digitized data from the input data 325.

The information extracted by the data extraction module 310 may be transferred to the data analysis module 315. The data analysis module 315 may be implemented as a hardware and/or software module. The data analysis module 315 may be capable of applying different methods of data analysis for the detection of the data variation level such as, for example, by measurement of the difference between the RMS value and the mean value of the samples. One of the calculations performed by the data analysis module 315 may be an estimate of noise level 330.

The noise level estimate 330 may be transferred to a video encoder and used, for example, to dynamically change parameters and/or characteristics of the encoding process or to be inserted into the encoded stream of output video data. The noise level estimate 330 may be also transferred to the host application to dynamically change parameters of other system devices such as, for example, the VDEC.

Figure 4:
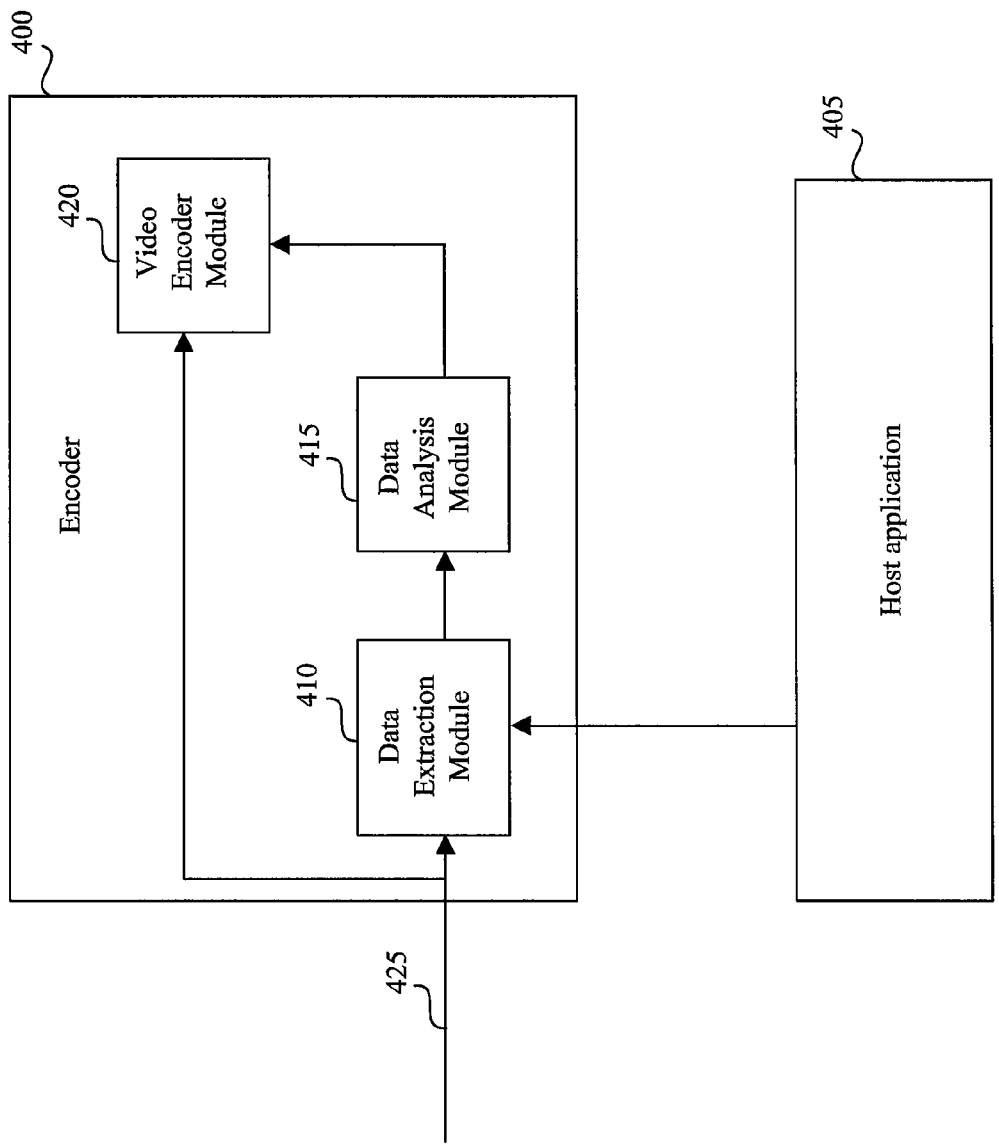
FIG. 4 illustrates an exemplary block diagram of a video encoding system, in accordance with an embodiment of the present invention.

FIG. 4 illustrates an exemplary block diagram of a video encoding system, in accordance with an embodiment of the present invention. The video encoding system of FIG. 4 may use estimation of noise level in encoding video. The video encoding system of FIG. 4 may comprise an encoder 400 and a host application 405. The encoder 400 may comprise a data extraction module 410, a data analysis module 415, and a video encoder module 420.

The input 425 to the encoder 400 may be a digitized video signal received from the VDEC, and may be made available to the data extraction module 410 and the video encoder module 420. The data extraction module 410 may be implemented in hardware and/or software/firmware, and may receive information from the host application 405 or the video encoder module 420. The information the data extraction module 410 receives from the host application 405 or the video encoder module 420 may be information regarding the position of the data to be extracted from the digitized video input signal 425. Extracted data may be analyzed in the data analysis module 415, which may output a noise level estimate. The data analysis module 415 may be implemented as a hardware and/or software module. The estimated noise level may then be transferred to the video encoder module 420. The video encoder module 420 may use the estimate of the noise level to dynamically change its algorithm and/or parameters of the encoding process to improve qualitative and/or quantitative characteristics and parameters of the encoded video data.

Figure 5:
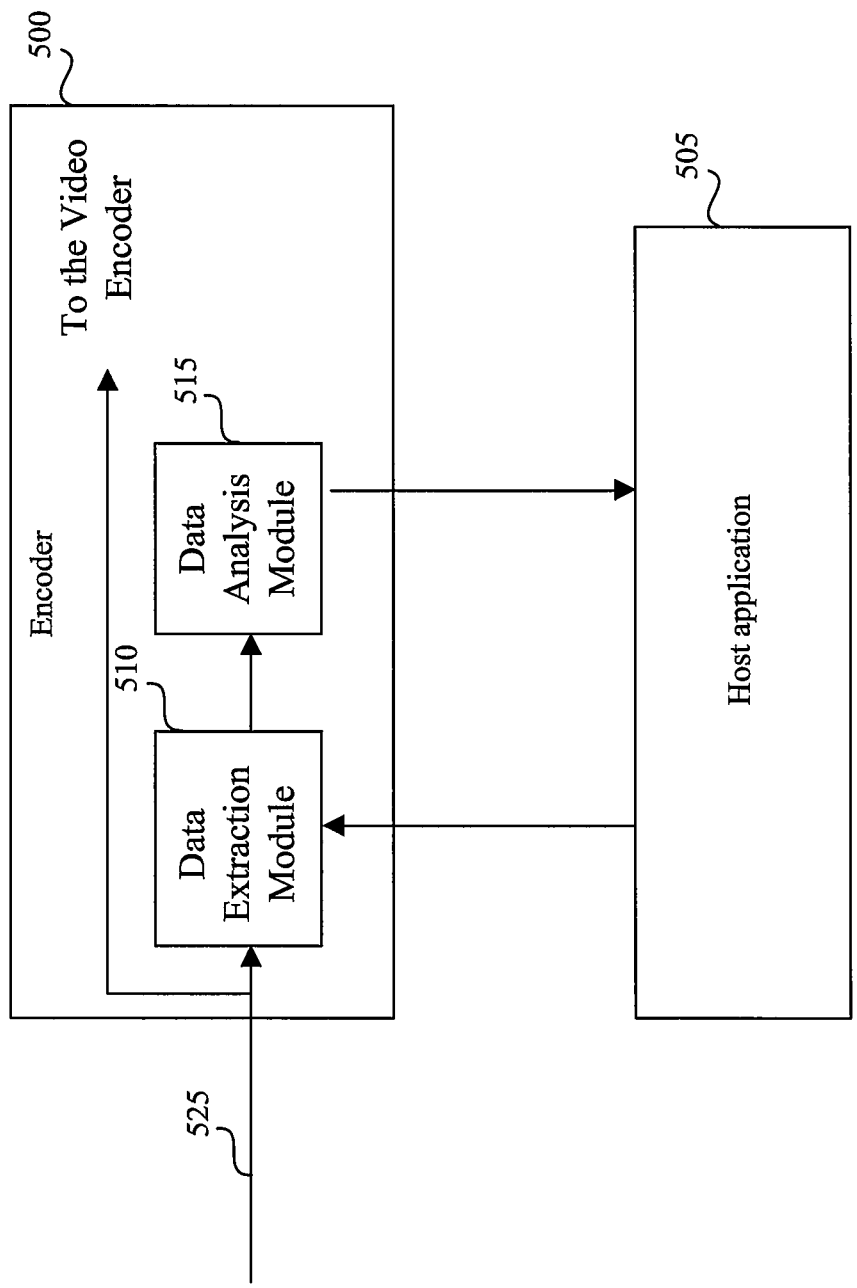
FIG. 5 illustrates another exemplary block diagram of a video encoding system, in accordance with an embodiment of the present invention.

FIG. 5 illustrates another exemplary block diagram of a video encoding system, in accordance with an embodiment of the present invention. The video encoding system of FIG. 5 may use estimation of noise level in encoding video. The video encoding system of FIG. 5 may comprise an encoder 500 and a host application 505. The encoder 500 may comprise a data extraction module 510, a data analysis module 515, and a video encoder 520 (not shown).

The input 525 to the encoder 500 may be a digitized video signal received from the VDEC, and may be made available to the data extraction module 510 and the video encoder 520. The data extraction module 510 may be implemented in hardware and/or software/firmware, and may receive information from the host application 505 or the video encoder module 520. The information the data extraction module 510 receives from the host application 505 or the video encoder module 520 may be information regarding the position of the data to be extracted from the digitized video input signal 525. Extracted data may be analyzed in the data analysis module 515, which may output a noise level estimate. The data analysis module 515 may be implemented as a hardware and/or software module. The estimated noise level may then be transferred to the host application 505 or the video encoder module 520. The host application 505 may then change the algorithm and/or parameters of other parts of the system based on the estimated noise level. The algorithm and/or parameters may be, for example, filter parameters in the VDEC. Simultaneously, the video encoder module 520 may use the estimate of the noise level to dynamically change its algorithm and/or parameters of the encoding process to improve qualitative and/or quantitative characteristics and parameters of the encoded video data.

Figure 6:
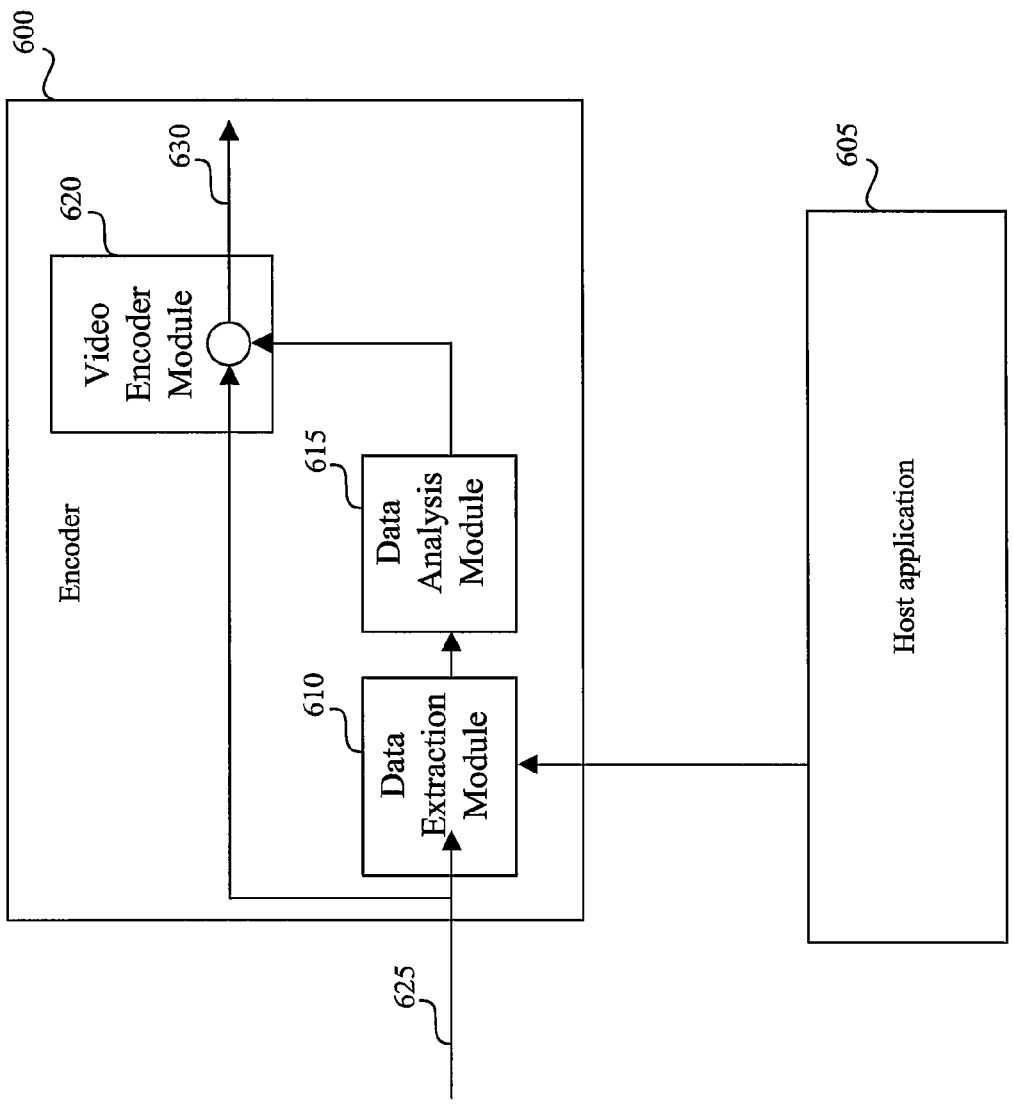
FIG. 6 illustrates another exemplary block diagram of a video encoding system, in accordance with an embodiment of the present invention.

FIG. 6 illustrates another exemplary block diagram of a video encoding system, in accordance with an embodiment of the present invention. The video encoding system of FIG. 6 may use estimation of noise level in encoding video. The video encoding system of FIG. 6 may comprise an encoder 600 and a host application 605. The encoder 600 may comprise a data extraction module 610, a data analysis module 615, and a video encoder module 620.

The input 625 to the encoder 600 may be a digitized video signal received from the VDEC, and may be made available to the data extraction module 610 and the video encoder module 620. The data extraction module 610 may be implemented in hardware and/or software/firmware, and may receive information from the host application 605 or the video encoder module 620. The information the data extraction module 610 receives from the host application 605 or the video encoder module 620 may be information regarding the position of the data to be extracted from the digitized video input signal 625. Extracted data may be analyzed in the data analysis module 615, which may output a noise level estimate. The data analysis module 615 may be implemented as a hardware and/or software module. The estimated noise level may then be transferred to the video encoder module 620. The video encoder module 620 may insert the estimated noise level into the encoded data 630, for example, as a User Data Section in a MPEG stream. The encoded data 630 may later be parsed, and the noise level estimate may be extracted to, for example, analyze the conditions of the transfer channel.

In an embodiment of the invention, digitized VBI lines that are blank may be utilized in estimating the noise level of the video signal. In another embodiment, parts of the VBI lines that are constant when they transfer VBI information may be utilized in estimating the noise level of the video signal. In either of the exemplary embodiments, the digitized VBI lines used in estimating the noise level may be in the active region, but may be left out of the output encoded video signal.

In an embodiment of the invention, the estimated noise level may be inserted into the encoded stream, as illustrated by the exemplary embodiment shown and described with reference to FIG. 6. In another embodiment of the invention, the estimated noise level may be transferred to a host application, as illustrated by the exemplary embodiment shown and described with reference to FIG. 5. In yet another embodiment of the invention, the estimated noise level may be used in the encoding process, as illustrated by the exemplary embodiment shown and described with reference to FIG. 4.

In an embodiment of the present invention, a video encoding system may be implemented as illustrated by any one of the systems described in FIG. 4, FIG. 5, and FIG. 6, or a combination thereof. Therefore, the estimated noise level may be utilized in different ways or a combination thereof. For example, the estimate of the noise level may be simultaneously transferred to the host applications and the video encoder module.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for encoding video, the method comprising:
extracting constant valued data from a video signal;
estimating a noise level associated with the video signal using the extracted data;
dynamically changing system parameters using the estimated noise level; and
encoding the video signal using the estimated noise level.

2. The method according to claim 1, wherein said constant valued data comprises digitized vertical blanking interval lines that are blank.

3. The method according to claim 1, wherein the extracted data comprises information associated with vertical blanking intervals in the video signal.

4. The method according to claim 3, wherein the vertical blanking intervals are part of an active video region of the video signal.

5. The method according to claim 3, wherein the vertical blanking intervals are not included in the encoded video signal.

6. The method according to claim 1, wherein one of the system parameters comprises bit rate.

7. The method according to claim 1, wherein the system parameters comprise filter coefficients.

8. The method according to claim 1, wherein the system parameters comprise quantization levels.

9. A system for encoding video, the system comprising:
at least one processor configured to extract constant valued data from a video signal;
said at least one processor configured to estimate a noise level associated with the video signal using the extracted data;
said at least one processor configured to dynamically change system parameters using the estimated noise level; and
said at least one processor configured to encode the video signal using the estimated noise level.

10. The system according to claim 9, wherein said constant valued data comprises digitized vertical blanking interval lines that are blank.

11. The system according to claim 9, wherein the extracted data comprises information associated with vertical blanking intervals in the video signal.

12. The system according to claim 11, wherein the vertical blanking intervals are part of an active video region of the video signal.

13. The system according to claim 11, wherein the vertical blanking intervals are not included in the encoded video signal.

14. The system according to claim 9, wherein one of the system parameters comprises bit rate.

15. The system according to claim 9, wherein the system parameters comprise filter coefficients.

16. The system according to claim 9, wherein the system parameters comprise quantization levels.

17. A non-transitory machine-readable storage having stored thereon, a computer program having at least one code section that encodes video, the at least one code section being executable by a machine for causing the machine to perform steps comprising:
extracting constant valued data from a video signal;
estimating a noise level associated with the video signal using the extracted data;
dynamically changing system parameters using the estimated noise level; and
encoding the video signal using the estimated noise level.

18. The non-transitory machine-readable storage according to claim 17, wherein said constant valued data comprises digitized vertical blanking interval lines that are blank.

19. The non-transitory machine-readable storage according to claim 17, wherein the extracted data comprises information associated with vertical blanking intervals in the video signal.

20. The non-transitory machine-readable storage according to claim 19, wherein the vertical blanking intervals are part of an active video region of the video signal.

21. The non-transitory machine-readable storage according to claim 19, wherein the vertical blanking intervals are not included in the encoded video signal.

22. The non-transitory machine-readable storage according to claim 17, wherein one of the system parameters comprises bit rate.

23. The non-transitory machine-readable storage according to claim 17, wherein the system parameters comprise filter coefficients.

24. The non-transitory machine-readable storage according to claim 17, wherein the system parameters comprise quantization levels.

* * * * *